(12) United States Patent
Kimura

(10) Patent No.: US 8,248,671 B2
(45) Date of Patent: Aug. 21, 2012

(54) IMAGE PROCESSING APPARATUS AND METHOD AND COMPUTER PROGRAM PRODUCT

(75) Inventor: Shuji Kimura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 628 days.

(21) Appl. No.: 12/477,251

(22) Filed: Jun. 3, 2009

(65) Prior Publication Data

US 2009/0316227 A1 Dec. 24, 2009

(30) Foreign Application Priority Data

Jun. 23, 2008 (JP) ................. 2008-163344

(51) Int. Cl.
*H04N 1/04* (2006.01)
*H04N 1/32* (2006.01)
*H04N 1/40* (2006.01)

(52) U.S. Cl. ........ 358/468; 358/474; 358/486; 358/448; 358/443; 358/444

(58) Field of Classification Search .................. 358/468, 358/474, 400, 402, 403, 444, 500, 505, 443, 358/448, 486; 382/312, 318, 319, 305, 307
See application file for complete search history.

(56) References Cited

U.S. PATENT DOCUMENTS

2011/0235063 A1 * 9/2011 Kondo ........................... 358/1.2

FOREIGN PATENT DOCUMENTS

| JP | 2004-297435 | 10/2004 |
| JP | 2005-259177 | 9/2005 |
| JP | 2005-275857 | 10/2005 |
| JP | 2006-140601 | 6/2006 |
| JP | 2006-270648 | 10/2006 |
| JP | 2007-88783 | 4/2007 |
| JP | 2007-245434 | 9/2007 |
| JP | 2008118385 A * | 5/2008 |
| JP | 4141629 | 6/2008 |

OTHER PUBLICATIONS

Official Action, issued May 8, 2012, in Japanese Patent Application No.: 2008-163344, filed Jun. 23, 2008.

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

Service information provided by a user is notified to a central processing unit (CPU), and the CPU executes a computer program for an operation process of the service, to determine a path (channel) through which image data should pass and a process content of image processes according to the service. Depending on the service information, image process is performed only by a first image data processor, image processes are performed by a combination of both the first image data processor and a second image data processor, or image process is performed only by the second image data processor.

5 Claims, 2 Drawing Sheets

IMAGE PROCESSING APPARATUS AND METHOD AND COMPUTER PROGRAM PRODUCT

CROSS-REFERENCE TO RELATED APPLICATIONS

The present application claims priority to and incorporates by reference the entire contents of Japanese priority document 2008-163344 filed in Japan on Jun. 23, 2008.

BACKGROUND OF THE INVENTION

1. Field of the Invention

The present invention relates to a technology for image processing on an image processing apparatus.

2. Description of the Related Art

Japanese Patent Application Laid-open No. 2005-259177 provides a technique for facilitating management of image processes to meet various requests. Specifically, this technique proposes including two image processors that perform predetermined image processes on received image data and output the processed image data. Moreover, this technique proposes adding header information including image processing information to the image data, subjecting the image data to the image process based on the contents of the header information, and updating the header information in the processed image data with new information.

Japanese Patent Application Laid-open No. 2005-275857 provides an image processing apparatus that includes an image input function, an image output function, an image conversion function, and an image storage function, and that makes it possible to perform a smooth operation for various requests by devising how to use a memory required for a series of image processes and also allows improved performance of concurrent operation for the image processes.

Further, Japanese Patent Application Laid-open No. 2006-140601 provides an image processing apparatus capable of concurrently performing processes on a plurality of divided image data that are subjected to the same process, and capable of achieving cost reduction and low power consumption by minimizing an increase in circuit scale.

Moreover, Japanese Patent Application Laid-open No. 2002-111988 provides an image processing apparatus that includes a second image processor, in addition to a first image processor, that performs an image process on accumulated and stored image data, which allows improvement of processing speed.

However, even if the conventional image processing apparatus has the two image processors as explained above, image data is not always subjected to an optimum image process for a type of services provided to users, and thus, it is not possible to fully bring out functions and performances of the provided services.

SUMMARY OF THE INVENTION

It is an object of the present invention to at least partially solve the problems in the conventional technology.

According to an aspect of the present invention, there is provided an image processing apparatus including an image scanner that scans an original to acquire scanned image data; a first image processor that performs a first image process on the scanned image data to generate first-processed image data; an image storage unit that stores therein the first-processed image data; a second image processor that performs a second image process on the first-processed image data stored in the image storage unit to generate second-processed image data; an image output unit that outputs image data from one of the first-processed image data generated by the first image processor, the first-processed image data stored in the image storage unit, and the second-processed image data generated by the second image processor; a service selector through which output service of the image data that is provided to a user who uses the image processing apparatus is selected by the user; and an image processing controller that selects at least one of modes in which the image process is performed only by the first image processor, the image processes are performed by a combination of both the first image processor and the second image processor, and the image process is performed only by the second image processor according to a content of the service selected by the user with the service selector, and controls selected image process.

According to anther aspect of the present invention, there is provided an image processing method including scanning an original to acquire scanned image data; first image processing including performing a first image process on the scanned image data to generate first-processed image data; storing the first-processed image data in an image storage unit; second image processing including performing a second image process on the first-processed image data stored in the image storage unit to generate second-processed image data; outputting image data from one of the first-processed image data generated at the first image processing, the first-processed image data stored in the image storage unit, and the second-processed image data generated by the second image processing; and first selecting including selecting at least one of modes in which the image process is performed only at the first image processing, the image processes are performed by a combination of both the first image processing and the second image processing, and the image process is performed only at the second image processing according to a content of a service selected by a user and controlling selected image process.

According to still another aspect of the present invention there is provided a computer program product comprising a computer usable medium having computer readable program codes embodied in the medium that, when executed, causes a computer to execute the above image processing method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. It is noted that because embodiments explained below are exemplary, various limitations that are technologically preferable could be added thereto or subtracted there-from. Thus, the scope of the present invention is not limited to these modes unless otherwise specified in the followings. The embodiments explain examples of using an image forming apparatus as an image processing apparatus, particularly, a digital multifunction product (MFP) that includes a plurality of functions of devices such as a copier, a scanner, a printer, and a facsimile device.

Figure 1:
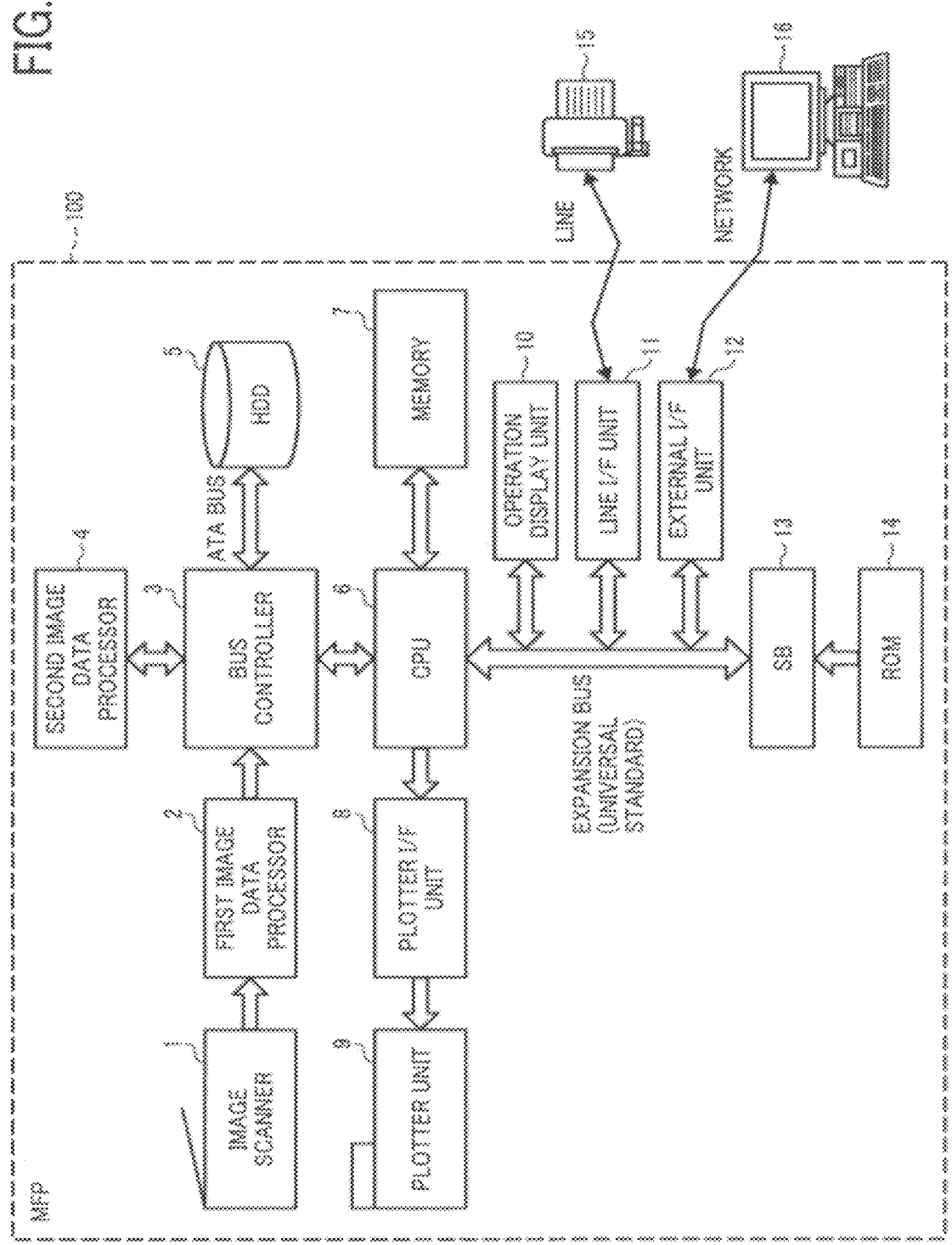
FIG. 1 is a block diagram of a hardware configuration of a digital multifunction product according to embodiments of the present invention.

FIG. 1 is a block diagram of a hardware configuration of an MFP 100 according to an embodiment of the present invention. The MFP 100 includes a scanner 1 as an image scanner, a first image data processor 2, a bus controller 3, a second image data processor 4, a hard disk drive (HDD) 5 as an image storage unit, a central processing unit (CPU) 6 as an image processing controller, a memory 7 as an image storage unit, a plotter interface (I/F) unit 8 as an image output unit, a plotter unit 9 as an image output unit, an operation display unit 10 as a service selector and a storage-mode selector, a line I/F unit 11 as an image output unit, an external I/F unit 12 as an image output unit, a south bridge (SB) 13, and a read only memory (ROM) 14.

The scanner 1 includes a line sensor formed with a charge-coupled device (CCD) as a photoelectric converter, an analog-to-digital (A/D) converter, and a drive circuit for these components. The scanner 1 scans a set original to obtain grayscale information for the original, and generates each of red, green, and blue (RGB) 8-bit image data from the grayscale information and outputs the generated image data. It is noted that the scanner 1 according to the embodiments can change a scaling factor of an image in a sub-scanning direction by changing a scanning speed in the sub-scanning direction (hereinafter, "sub-scanning scaling due to speed changing mechanism").

The first image data processor 2 receives the image data from the scanner 1 subjects the image data to appropriate processes (e.g. γ process, filter process, color conversion process, scaling process, and gradation process) depending on the types of services provided by the MFP 100.

The bus controller 3 is a controller of a data bus that exchanges required image data and various data such as control commands between components in the MFP 100. The bus controller 3 also has a function of bridging between plural types of bus standards. According to the embodiments, the first image data processor 2, the second image data processor 4, and the CPU 6 are connected to each other through a peripheral component interconnect (PCI)-Express bus and are connected to the HDD 5 through an AT Attachment (ATA) bus, which are implemented as an application specific integrated circuit (ASIC).

The second image data processor 4 subjects the image data having being subjected to the appropriate processes by the first image data processor 2 to further appropriate processes (e.g. filter process, color conversion process, scaling process, and gradation process).

The HDD 5 is a large-sized storage unit that stores therein electronic data used also in a desktop personal computer (PC), and mainly stores therein image data and supplemental information to the image data in the MFP 100. A hard disk used in the embodiments is connected via the ATA bus, which is standard extended integrated drive electronics (IDE), to the bus controller 3.

The CPU 6 is a microprocessor that controls the whole of the MFP 100. The CPU 6 is an integrated CPU in which some functions are added to a single-core CPU which is widely used in recent years. The CPU 6 can be, for example, RM11100 manufactured by PMC Corporation in which a function of connecting the CPU to a universal standard I/F or a function of connecting the CPU to buses using crossbar switches is integrated.

The memory 7 is a volatile memory that stores therein data to be temporarily exchanged so as to accommodate a difference between speeds when the bus standards are bridged and a difference between processing speeds of connected components, and that temporarily stores therein programs and intermediate process data when the CPU 6 controls the MFP 100. Because a high-speed process is required for the CPU 6, a system is booted using a boot program stored in the ROM 14 upon ordinary booting, and, thereafter, processes are executed by the computer program expanded in the memory 7 that can be speedily accessed. A double inline memory module (DIMM) used for a standardized PC is used in the embodiments.

The plotter I/F unit 8 receives image data including cyan, magenta, yellow, and black (CMYK) sent to the CPU 6 through an integrated universal standard I/F, and performs a bus bridge process in which the received image data is output to a specific I/F of the plotter unit 9. The universal standard I/F used in the embodiments is the PCI-Express bus.

The plotter unit 9 receives the image data including the CMYK, and outputs (prints) an image corresponding to the received image data onto a paper through an electrophotographic process using a laser beam.

The SB 13 is a universal electronic device called "south bridge" which is one of the chipsets used in the PC. More specifically, the SB 13 is a universal circuit formed with a bridging function of the buses often used for constructing a CPU system mainly including the PCI-Express and an industrial standard architecture (ISA) bridge. The SB 13 bridges between the ROM 14 and the other components in the embodiments.

The ROM 14 is a memory that stores therein programs (including the boot program) used when the CPU 6 controls the MFP 100.

The operation display unit 10 is an interface between the MFP 100 and the user. The operation display unit 10 includes a liquid-crystal display (LCD) and key switches, and displays various statuses and an operating method of the MFP 100 on the LCD and detects a key-switch entry from the user. The operation display unit 10 is connected to the CPU 6 through the PCI-Express bus in the embodiments.

The line I/F unit 11 is a unit that connects between the PCI-Express bus and a telephone line. This unit allows the MFP 100 to exchange various data with an external device through the telephone line. The line I/F unit 11 functions as an image output unit. A fax 15 provided outside the MFP 100 is an ordinary facsimile device which enables to exchange image data with the MFP 100 via the telephone line.

The external I/F unit 12 is a unit that connects between the PCI-Express bus and an external device. This unit allows the MFP 100 to exchange various data with the external device. A network (Ethernet (registered trademark)) is used as a connection I/F of the unit in the embodiments. In other words, the MFP 100 is connected to the network through the external I/F unit 12. The external I/F unit 12 functions as an image output unit. A PC 16 provided outside the MFP 100 is a personal computer, and the user can input and output various controls and image data to and from the MFP 100 through application software and driver installed in the PC 16.

Services provided by the MFP 100 to users include copy service, printer service, scanner delivery service, facsimile (fax) transmission service, document box (D-BOX) service, copy+D-BOX service, scanner-delivery+D-BOX service, and fax-transmission+D-BOX service.

The copy service is provided in the following manner. That is, image data obtained by causing the scanner 1 to scan an image of an original is subjected to image processes by the first image data processor 2 or the second image data processor 4, and then the processed image data is sent to the plotter unit 9, where it is printed as a visible image on a sheet of paper.

The printer service is provided in the following manner. That is, print data such as character encoding or drawing data received from the PC 16 is expanded to image data, and then the expanded image data is sent to the plotter unit 9, where it is printed as a visible image on a sheet of paper.

The scanner delivery service is provided in the following manner. That is, image data obtained by causing the scanner 1 to scan an image of an original is subjected to image processes by the first image data processor 2 or the second image data processor 4, and then, the processed image data is delivered by electronic mail or the like to the external device such as the preset PC 16 through the external I/F unit 12. The scanner delivery service also includes remote scan service. The nature of this service is such that the scanner 1 is caused to scan an image of an original by remote control from the PC 16, and then image data of the scanned image is downloaded to the PC 16 that has performed the remote control through the external I/F unit 12.

The fax transmission service is provided in the following manner. That is, image data obtained by causing the scanner 1 to scan an image of an original is subjected to image processes by the first image data processor 2 or the second image data processor 4, and then the processed image data is transmitted by facsimile to an external device such as the preset fax 15 through the line I/F unit 11, or such that the image data having been stored in the HDD 5 is also transmitted by facsimile to a preset external device. It is noted that the fax transmission service includes fax direct-transmission service such that the user performs real-time negotiation with a machine in the other side (external device) upon using the service and transmits the image data thereto, and also fax memory transmission service such that the user temporarily stores the image data in the memory 7 or the like in the MFP 100 upon using the service and performs negotiation with a machine in the other side (external device) at a certain timing and transmits the image data thereto.

The D-BOX service is provided in the following manner. That is, image data obtained by causing the scanner 1 to scan an image of an original is stored in the HDD 5 or the image data having been stored in the HDD 5 is sent to the plotter unit 9 where it is printed as a visible image on a sheet of paper, or such that the external I/F unit 12 is caused to deliver the stored image data by electronic mail to an external device such as the preset PC 16, or such that the line I/F unit 11 is caused to transmit the stored image data by fax to an external device such as the preset fax 15.

The copy+D-BOX service is provided in the following manner. That is, image data obtained by causing the scanner 1 to scan an image of an original is stored in the HDD 5 and is also sent to the plotter unit 9 where it is printed as a visible image on a sheet of paper.

The scanner-delivery+D-BOX service is provided in the following manner. That is, image data obtained by causing the scanner 1 to scan an image of an original is stored in the HDD 5 and is also delivered by electronic mail or the like through the external I/F unit 12 to an external device such as the preset PC 16.

The fax-transmission+D-BOX service is provided in the following manner. That is, image data obtained by causing the scanner 1 to scan an image of an original is stored in the HDD 5 and is also transmitted by fax through the line I/F unit 11 to an external device such as the preset fax 15.

The MFP as the image processing apparatus according to the embodiments is configured in the above manner, and a characteristic configuration and operation are explained below in each of the embodiments.

A first embodiment of the embodiments explains a case where the user uses arbitrary service provided by the MFP 100. For example, in the process of selecting a desired service [S], the user of the MFP 100 sets an original on the scanner 1, and sets an output condition or the like and enters start of the service as required to the operation display unit 10.

The operation display unit 10 converts the information entered by the user to control command data for the inside of the machine and issues the control command data. The issued control command data is notified to the CPU 6 through the PCI-Express bus. The CPU 6 executes a program for an operation process of the service [S] and determines a path (channel) through which the image data corresponding to the service [S] is passed and a process content of image processes, according to the control command data for starting the service.

A mode of the image processes in the configuration of the MFP 100 includes three modes as follows. There are a mode (1) in which the image processes are performed only by the first image data processor 2, a mode (2) in which the image processes are performed by a combination of both the first image data processor 2 and the second image data processor 4, and a mode (3) in which the image processes are performed only by the second image data processor 4.

The processes are sequentially explained hereinafter. In the mode (1), image data is obtained by causing the scanner 1 to scan an original and is subjected to image processes, by the first image data processor 2, suitable for an output destination and an output condition or the like specified by the user, and the processed image data is sent to the bus controller 3. When the image data is received from the first image data processor 2, the bus controller 3 stores the image data in the memory 7 via the CPU 6.

The image data stored in the memory 7 is sent to the plotter unit 9 via the CPU 6 and the plotter I/F unit 8 when it is to be printed. The plotter unit 9 outputs the received image data to a transfer paper, to generate a copy of the original. If the image data is to be transmitted to the outside, the image data stored in the memory 7 is transmitted to the outside of the MFP 100 via the CPU 6 and the line I/F unit 11 or the external I/F unit 12.

Next, the mode (2) can be divided into "single output" and "multiple outputs".

In the single output, image data obtained by causing the scanner 1 to scan an original is subjected to image processes for unifying the image data to a preset feature by the first image data processor 2, and the processed image data is sent to the bus controller 3. When the image data is received from the first image data processor 2, the bus controller 3 stores the image data in the memory 7 via the CPU 6. It is noted that there is also a case where the image data stored in the memory 7 is permanently stored in the HDD 5 as required depending on the service [S].

Subsequently, the image data stored in the memory 7 is sent to the second image data processor 4 via the CPU 6 and the bus controller 3. The second image data processor 4 subjects the received image data to image processes suitable for an output destination and an output condition or the like specified by the user, and sends the processed image data to the bus controller 3. When the image data is received from the second image data processor 4, the bus controller 3 stores the image data in the memory 7 via the CPU 6. It is noted that there is also a case where the image data stored in the memory 7 is permanently stored in the HDD 5 as required depending on the service [S].

The image data stored in the memory 7 is sent to the plotter unit 9 via the CPU 6 and the plotter I/F unit 8 when it is to be printed. The plotter unit 9 outputs the received image data to a transfer paper, to generate a copy of the original. When the image data is to be transmitted to the outside, the image data stored in the memory 7 is transmitted to the outside of the MFP 100 via the CPU 6 and the line I/F unit 11 or the external T/F unit 12.

An overview of entire operations in the multiple outputs is explained below. Processes from subjecting the image data received from the scanner 1 to image processes by the first image data processor 2 to storing the processed image data in the memory 7 are commonly executed to all outputs. Thereafter, the image data read from the memory 7 is subjected to image processes by the second image data processor 4, and each process in the plotter I/F unit 8, the line I/F unit 11, or the external I/F unit 12 is performed for each output. Detailed operation thereof is explained hereinafter.

The image data obtained by causing the scanner 1 to scan an original is subjected to image processes for unifying the image data to a preset feature by the first image data processor 2, and the processed image data is sent to the bus controller 3. When the image data is received from the first image data processor 2, the bus controller 3 stores the image data in the memory 7 via the CPU 6. It is noted that the image data stored in the memory 7 is permanently stored in the HDD 5 as required depending on the service [S].

The processes performed so far are common to all the outputs, however, processes hereinafter are individually performed for each output. The image data stored in the memory 7 is sent to the second image data processor 4 via the CPU 6 and the bus controller 3. The second image data processor 4 subjects the received image data to image processes suitable for an output destination and an output condition or the like specified by the user, and sends the processed image data to the bus controller 3. When the image data is received from the second image data processor 4, the bus controller 3 stores the image data in the memory 7 via the CPU 6. It is noted that the image data temporarily stored in the memory 7 is permanently stored in the HDD 5 as required depending on the type of the service [S].

Subsequently, the image data stored in the memory 7 is sent to the plotter unit 9 via the CPU 6 and the plotter I/F unit 8 when it is to be printed. The plotter unit 9 outputs (prints) an image corresponding to the received image data onto a paper to generate a copy of the original. When the image data is to be transmitted to the outside, the image data stored in the memory 7 is transmitted to the outside of the MFP 100 via the CPU 6 and the line I/F unit 11 or the external I/F unit 12.

Next, in the mode (3), target image data permanently stored in the HDD 5 (image data selected by the user) is stored in the memory 7 via the CPU 6 and the bus controller 3. The image data stored in the memory 7 is sent to the second image data processor 4 via the CPU 6 and the bus controller 3.

The second image data processor 4 subjects the received image data to image processes suitable for an output destination and an output condition or the like specified by the user, and sends the processed image data to the bus controller 3. When the image data is received from the second image data processor 4, the bus controller 3 stores the image data in the memory 7 via the CPU 6.

The image data stored in the memory 7 is sent to the plotter unit 9 via the CPU 6 and the plotter I/F unit 8 when it is to be printed. The plotter unit 9 outputs the received image data to a transfer paper, to generate a copy of the original. When the image data is to be transmitted to the outside, the image data stored in the memory 7 is transmitted to the outside of the MFP 100 via the CPU 6 and the line I/F unit 11 or the external I/F unit 12.

As explained above, according to the first embodiment, optimum control according to various services is automatically performed, which makes it possible to fully bring out the functions and performances of the services. The "various services" used in the present invention represents services provided by the image processing apparatus according to the present invention, and can be roughly divided into two types: "service not including permanent storage of image data" and "service including permanent storage of image data".

Because the "service not including permanent storage of image data" indicates basically that the image data is not permanently stored after the service is used, the image data will never be reused. Therefore, this type of service does not require consideration for reusability of the image data, and thus improved productivity upon using the service is of value to the user. To meet this requirement, control is provided such that the productivity is improved as much as possible without losing functionality. However, control allowing for reusability of the image data may be taken into consideration if necessary. For example, the service may include a case in which the image data is output to multiple destinations.

Because the "service including permanent storage of image data" indicates that the image data is permanently stored after the service is used, it is necessary to assume reuse of the image data. However, a content required for "reuse" is largely different between a "required level at which the image data is output while high-image quality is maintained without functional restriction if the condition is the same as that at the time of storage" and a "required level at which the image data is output while high-image quality is maintained without functional restriction even if the condition is different from that at the time of storage". Moreover, because these required levels are different from each other for each user, it is required to handle both of the levels. Therefore, each control is provided according to respective required levels allowing for the productivity and reusability.

As explained above, according to the first embodiment, optimum control is automatically provided according to any one of the various services, which makes it possible to fully bring out the function and performance of the service. Thus, the service can be easily used and the productivity is improved.

The MFP 100 according to a second embodiment of the embodiments has services to output image data scanned by the scanner 1, the services corresponding to those such as copying, scanner delivery, and fax transmission. The second embodiment explains a case in which the "fax direct-transmission service" and the "remote scan service" among the services are used.

When the fax direct-transmission service is to be used, first, the user sets an original on the scanner 1, and then sets a desired mode or the like and enters start of the fax direct-transmission service to the operation display unit 10. The operation display unit 10 converts the information entered by the user to control command data for the inside of the machine and issues the control command data. The issued control command data is notified to the CPU 6 via the PCI-Express bus.

The CPU 6 executes the computer program for the service process according to the control command data for starting the fax direct-transmission service, and determines a path (channel) through which the image data is passed and a process content of image processes. The fax direct-transmission service is determined as the "mode (1) in which the image processes are performed only by the first image data processor 2". An operation process of the mode (1) is explained hereinafter.

Before the original is scanned by the scanner 1 in FIG. 1, device capability information for the fax 15 as a machine in the other side is acquired through negotiation with the fax 15 via the line I/F unit 11, and then the scanner 1 starts scanning the original.

RGB 8-bit digital image data obtained by causing the image scanner 1 to scan the original is subjected, by the first image data processor 2, to image processes suitable for an output destination and an output condition or the like specified by the user, and the processed image data is sent to the bus controller 3.

Figure 2:
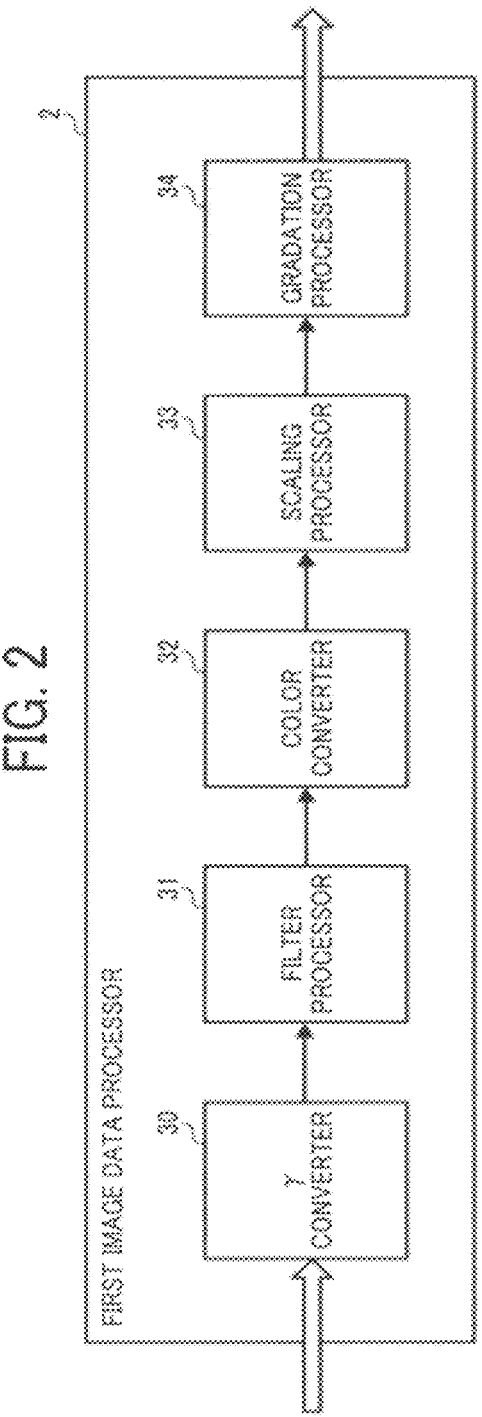
FIG. 2 is a detailed block diagram of an exemplary configuration of a first image data processor shown in FIG. 1.

FIG. 2 is a detailed block diagram of an example of configuration of the first image data processor 2. The first image data processor 2 includes a γ converter 30, a filter processor 31, a color converter 32, a scaling processor 33, and a gradation processor 34.

The γ converter 30 converts the RGB image data received from the scanner 1 to those so that brightness features of the RGB image data are made appropriate. In the second embodiment, the image data is converted so as to have a linear feature in the brightness.

The filter processor 31 corrects the sharpness of the RGB image data so that the reproducibility upon fax transmission is improved. Specifically, the RGB image data is subjected to a sharpening/smoothing process according to desired mode information. For example, in a text mode, the image data is subjected to the sharpening process to make each character clear and sharp, while in the photographic mode, the image data is subjected to the smoothing process to express smooth gradation thereof.

The color converter 32 receives RGB 8-bit data and converts it to monochrome 8-bit image data that is generally used in the fax device.

The scaling processor 33 converts a size (resolution) of the monochrome image data to a size (resolution) for transmission and reception by the fax device. In the second embodiment, the size is converted to 200 dots per inch (dpi) in a main scanning direction. It is noted that conversion of the size to 100 dpi in a sub-scanning direction is performed by means of the sub-scanning scaling due to speed changing mechanism of the scanner 1.

The gradation processor 34 receives monochrome 8-bit image data and performs a gradation conversion process on the image data according to gradation processing capability that allows the fax device to transmit and receive the image data. In the second embodiment, the gradation is binarized using a simple binarization method.

The bus controller 3 receives the image data from the first image data processor 2 and stores it in the memory 7 via the CPU 6. The image data stored in the memory 7 is transmitted to the outside of the MFP 100 via the CPU 6 and the line I/F unit 11.

When the remote scan service is to be used, the user sets an original on the scanner 1 and issues an instruction to start the remote scan service via the external I/F unit 12 by remote control from the PC 16. The MFP 100 receives the instruction, converts this to control command data for the inside of the machine, and issues the control command data. The issued control command data is notified to the CPU 6 via the PCI-Express bus.

The CPU 6 executes the computer program for the service process according to the control command data for starting the remote scan service, and determines a path (channel) through which the image data is passed and a process content of image processes. The remote scan service is determined as the "mode (1) in which the image processes are performed only by the first image data processor 2". An operation process of the mode (1) is explained hereinafter.

RGB 8-bit digital image data obtained by causing the image scanner 1 to scan the original is subjected, by the first image data processor 2, to image processes suitable for an output destination and an output condition or the like specified by the user, and the processed image data is sent to the bus controller 3.

As shown in FIG. 2, the γ converter 30 of the first image data processor 2 converts the RGB image data received from the scanner 1 to those so that brightness features of the RGB image data are made appropriate. In the second embodiment, the image data is converted so as to have a linear feature in the brightness.

The filter processor 31 corrects the sharpness of the RGB image data so that the reproducibility upon remote scan is improved. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 32 receives RGB 8-bit data and converts it to a specified color space. In the second embodiment, the RGB data is converted to a standard RGB (sRGB) color space with 8 bits for each color.

The scaling processor 33 converts a size (resolution) of the monochrome image data to a size (resolution) for transmission to the PC 16. In the second embodiment, the size is converted to 200 dpi in the main scanning direction. It is noted that conversion of the size to 200 dpi in the sub-scanning direction is performed by means of the sub-scanning scaling due to speed changing mechanism of the scanner 1.

The gradation processor 34 performs a gradation conversion process on the image data according to gradation processing capability that allows the image data to be transmitted and received through specified scanner delivery. In the second embodiment, no particular gradation process is performed because 160,000 colors of the 8-bit RGB colors are assumed to be specified.

The bus controller 3 receives the image data from the first image data processor 2 and stores it in the memory 7 via the CPU 6. The image data stored in the memory 7 is transmitted to the outside of the MFP 100 via the CPU 6 and the external I/F unit 12.

As explained above, according to the second embodiment, it is possible to improve an output throughput (productivity) without losing functionality by providing process control such that the image data is subjected to the image processes only by the first image data processor 2.

Moreover, according to the second embodiment, it is possible to achieve stable productivity without being affected by any operating condition of the second image data processor 4 by providing use control such that the second image data processor 4 is not used. On the other hand, even if the first image data processor 2 is occupied for a long period of time, this does not affect the second image data processor 4. In the second embodiment, it is possible to fully bring out the functions and performances, as the MFP 100, of the service (fax direct-transmission service) in which the image data is desired to be smoothly output while communication with the other machine is performed in real time, and of the service (remote scan service) that is desired to occupy the scanner 1 through remote control or the like.

In a third embodiment of the embodiments, the service of outputting image data scanned by the scanner 1 to multiple destinations corresponds to simultaneous use of the copy service, the scanner delivery service, and the fax transmission service. The third embodiment explains an operation of using "service for scanner delivery while copying" among the services.

When the service for scanner delivery while copying is to be used, as shown in FIG. 1, the user sets an original on the scanner 1, and performs setting of a desired mode or the like and enters start of the service for scanner delivery while copying using the operation display unit 10.

The operation display unit 10 converts the information entered by the user to control command data for the inside of the machine and issues the control command data. The issued control command data is notified to the CPU 6 via the PCI-Express bus.

The CPU 6 executes the computer program for the service process according to the control command data for starting the service for scanner delivery while copying, and determines a path (channel) through which the image data is passed and a process content of image processes. The service for scanner delivery while copying is determined as the "mode (2) in which the image processes are performed by a combination of both the first image data processor 2 and the second image data processor 4". An operation process of the mode (2) is explained hereinafter.

As shown in FIG. 2, the γ converter 30 of the first image data processor 2 unifies the brightness of the RGB image data received from the scanner 1 to a preset feature. In the third embodiment, the image data is converted so as to have a linear feature in the brightness.

The filter processor 31 unifies the sharpness of the RGB image data to a preset feature. In the third embodiment, the sharpness is converted so that it has a preset modulation transfer function (MTF) feature value.

The color converter 32 unifies the colors of the RGB image data to a preset feature. In the third embodiment, for example, the color space is converted to an Adobe-RGB color space defined by Adobe Systems Inc.

The scaling processor 33 unifies the size (resolution) of RGB image data to a preset feature. In the third embodiment, the size (resolution) is converted to 600 dpi (default). The bus controller 3 in FIG. 1 receives the RGB image data from the first image data processor 2 and stores it in the memory 7 via the CPU 6. The processes performed so far are common to both the "copying" and the "scanner delivery", and processes hereinafter are respectively performed for each output.

In the case of copying, the RGB image data stored in the memory 7 is output to the plotter unit 9 via the second image data processor 4, and a copy of the original is generated.

Figure 3:
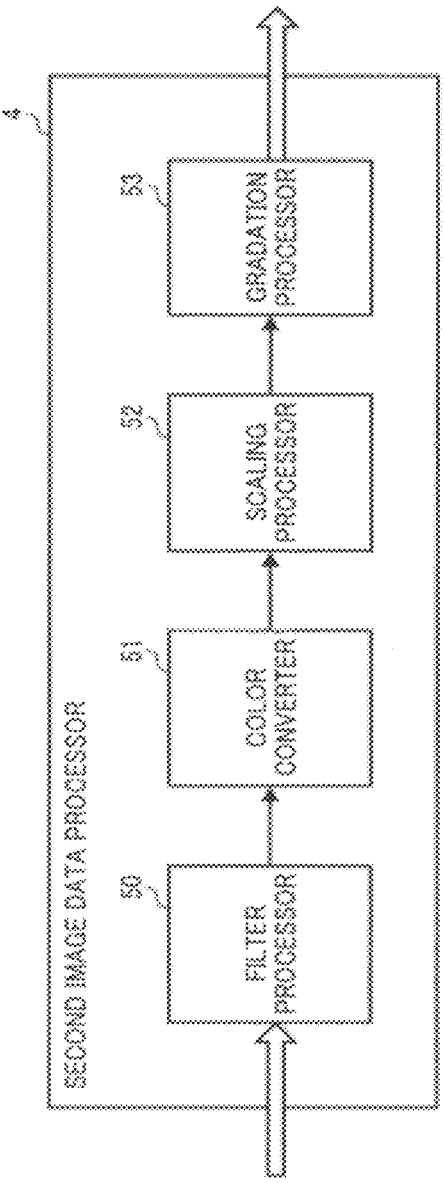
FIG. 3 is a detailed block diagram of an exemplary configuration of a second image data processor shown in FIG. 1.

FIG. 3 is a detailed block diagram of an example of configuration of the second image data processor 4. The second image data processor 4 includes a filter processor 50, a color converter 51, a scaling processor 52, and a gradation processor 53.

The filter processor 50 corrects the sharpness of the RGB image data so that the reproducibility of the RGB image data is improved when it is to be output to the plotter unit 9. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 51 receives the RGB 8-bit data and converts it to CMYK 8-bit data that uses a color space for the plotter unit. At this time, color saturation is also controlled according to user's desired mode information.

The scaling processor 52 converts a size (resolution) of the CMYK image data to a size (resolution) according to the reproducibility of the plotter unit 9. In the third embodiment, because the performance of the plotter unit 9 is provided with 600 dpi output, no particular conversion is performed.

The gradation processor 53 receives the CMYK 8-bit data and performs a gradation conversion process on the data according to gradation processing capability of the plotter unit 9. In the third embodiment, the gradation is converted to CMYK 2-bit data using an error diffusion method as one of pseudo-halftone processes.

In the case of the scanner delivery, the RGB image data stored in the memory 7 is output to the external I/F unit 12 via the second image data processor 4, and the scanner delivery is performed.

As shown in FIG. 3, the filter processor 50 of the second image data processor 4 corrects the sharpness of the RGB image data so that the reproducibility of the RGB image data is improved when the scanner delivery is performed. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 51 receives the RGB 8-bit data and converts it to a specified color space. In the third embodiment, the RGB data is converted to the sRGB color space with 8 bits for each color.

The scaling processor 52 converts a size (resolution) of the sRGB image data to a size (resolution) for transmission and reception through specified scanner delivery. In the third embodiment, the size is converted to 200 dpi in the main scanning direction multiplied by 200 dpi in the sub-scanning direction.

The gradation processor 53 performs a gradation conversion process on the image data according to gradation processing capability that allows the image data to be transmitted and received through specified scanner delivery. In the third embodiment, no particular gradation process is performed because 160,000 colors of the 8-bit RGB colors are assumed to be specified.

As explained above, according to the third embodiment, control is provided such that the first image data processor 2 subjects a plurality of types of outputs to common image processes to generate image data with a unified feature, and further control is provided such that the second image data processor 4 subjects each output to appropriate image processes respectively. These processes allow the image data to be output to multiple destinations at single scanning operation. In other words, it is possible to improve productivity without losing functionality. For example, this case corresponds to a case when the user wants to simultaneously copy an original and perform the scanner delivery thereof.

In a fourth embodiment of the embodiments, a storage mode of image data scanned by the scanner 1 is set to a reusability-priority mode, and the service of outputting the image data while permanently storing it in the HDD 5 corresponds to the copy+D-BOX service, the scanner-delivery+D-

BOX service, the fax-transmission+D-BOX service, and the like. The fourth embodiment explains an operation of using the "copy+D-BOX service" among the services.

When the copy+D-BOX service is to be used, the user sets an original on the scanner 1, sets the storage mode to the reusability-priority mode using the operation display unit 10 which is a storage-mode selector, and performs setting of other desired modes or the like and enters start of the copy+D-BOX service to the operation display unit 10.

The operation display unit 10 converts the information entered by the user to control command data for the inside of the machine and issues the control command data. The issued control command data is notified to the CPU 6 via the PCI-Express bus.

The CPU 6 executes the computer program for the service process according to the control command data for starting the copy+D-BOX service, and determines a path (channel) through which the image data is passed and a process content of image processes. The copy+D-BOX service is determined as the "mode (2) in which the image processes are performed by a combination of both the first image data processor 2 and the second image data processor 4". An operation process of the mode (2) is explained hereinafter.

As shown in FIG. 2, the γ converter 30 of the first image data processor 2 unifies the brightness of the RGB image data received from the scanner 1 to a preset feature. In the fourth embodiment, the image data is converted so as to have a linear feature in the brightness.

The filter processor 31 unifies the sharpness of the RGB image data to a preset feature. In the fourth embodiment, the sharpness is converted so that it has a preset MTF feature value.

The color converter 32 unifies the colors of the RGB image data to a preset feature. In the fourth embodiment, the color space is converted to the Adobe-RGB color space defined by Adobe Systems Inc.

The scaling processor 33 unifies the size (resolution) of the RGB image data to a preset feature. In the fourth embodiment, the size (resolution) is converted to 600 dpi.

The bus controller 3 receives the RGB image data from the first image data processor 2 and stores it in the memory 7 via the CPU 6. The RGB image data stored in the memory 7 is transmitted via the CPU 6 and the bus controller 3 to the HDD 5 where the RGB image data is permanently stored as highly reusable image data.

The RGB image data stored in the memory 7 is output to the plotter unit 9 via the second image data processor 4, and a copy of the original is generated.

Next, the filter processor 50 of the second image data processor 4 shown in FIG. 3 corrects the sharpness of the RGB image data so that the reproducibility of the RGB image data is improved when it is output to the plotter unit 9. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 51 receives the RGB 8-bit data and converts it to CMYK 8-bit data that uses a color space for the plotter unit. At this time, color saturation is also controlled according to user's desired mode information.

The scaling processor 52 converts a size (resolution) of the CMYK image data to a size (resolution) according to the reproducibility of the plotter unit 9. In the fourth embodiment, because the performance of the plotter unit 9 is provided with 600 dpi output, no particular conversion is performed.

The gradation processor 53 receives the CMYK 8-bit data and performs a gradation conversion process on the data according to gradation processing capability of the plotter unit 9. In the fourth embodiment, the gradation is converted to CMYK 2-bit data using the error diffusion method as one of pseudo-halftone processes.

As explained above, according to the fourth embodiment, control is provided such that the image data is subjected to appropriate image processes by a combination of both the first image data processor 2 and the second image data processor 4, and the image data with the unified feature is permanently stored, so that upon using the service of outputting the permanently stored image data, the image data can be output while high image quality is maintained without functional restriction even if the condition is different from that at the time of storage. In other words, highly reusable image data can be permanently stored.

In a fifth embodiment of the embodiments, a storage mode of image data scanned by the scanner 1 is set to a productivity-priority mode, and the service of outputting the image data while permanently storing it in the HDD 5 corresponds to the copy+D-BOX service, the scanner-delivery+D-BOX service, the fax-transmission+D-BOX service, and the like. The fifth embodiment explains an operation of using the "scanner-delivery+D-BOX service" among the services.

When the scanner-delivery+D-BOX service is to be used, the user sets an original on the scanner 1, sets the storage mode to the productivity-priority mode using the operation display unit 10 which is the storage-mode selector, and performs setting of other desired modes or the like and enters start of the scanner-delivery+D-BOX service to the operation display unit 10.

The operation display unit 10 converts the information entered by the user to control command data for the inside of the machine and issues the control command data. The issued control command data is notified to the CPU 6 via the PCI-Express bus.

The CPU 6 executes the computer program for the service process according to the control command data for starting the scanner-delivery+D-BOX service, and determines a path (channel) through which the image data is passed and a process content of image processes. The scanner-delivery+D-BOX service is determined as the "mode (1) in which the image processes are performed only by the first image data processor 2". An operation process of the mode (1) is explained below.

RGB 8-bit digital image data obtained by causing the scanner 1 to scan an original is subjected to image processes, by the first image data processor 2, suitable for an output destination and an output condition or the like specified by the user, and the processed image data is sent to the bus controller 3.

As shown in FIG. 2, the γ converter 30 of the first image data processor 2 converts brightness features of the RGB image data received from the scanner 1 to appropriate ones. In the fifth embodiment, the image data is converted so as to have a linear feature in the brightness.

The filter processor 31 corrects the sharpness of the RGB image data so that the reproducibility upon the scanner delivery is improved. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 32 receives the RGB 8-bit data and converts it to a specified color space. In the second embodiment, the RGB data is converted to the sRGB color space with 8 bits for each color.

The scaling processor 33 converts a size (resolution) of the monochrome image data to a size (resolution) for transmission to the PC 16. In the fifth embodiment, the size is converted to 200 dpi in the main scanning direction. It is noted that conversion of the size to 200 dpi in the sub-scanning direction is performed by means of the sub-scanning scaling due to speed changing mechanism of the scanner 1.

The gradation processor 34 performs a gradation conversion process on the image data according to gradation processing capability that allows the image data to be transmitted and received through specified scanner delivery. In the fifth embodiment, no particular gradation process is performed because 160,000 colors of the 8-bit RGB colors are assumed to be specified.

The bus controller 3 receives the image data from the first image data processor 2 and stores it in the memory 7 via the CPU 6. The image data stored in the memory 7 is transmitted via the CPU 6 and the bus controller 3 to the HDD 5, in which the image data is permanently stored.

Subsequently, the image data stored in the memory 7 is transmitted to the outside of the MFP 100 via the CPU 6 and the external I/F unit 12.

As explained above, according to the fifth embodiment, it is possible to improve output throughput (productivity) without losing functionality by providing process control such that the image data is subjected to appropriate image processes only by the first image data processor 2.

Furthermore, according to the fifth embodiment, upon using the service of outputting the permanently stored image data, the image data can be output while high image quality is maintained without functional restriction if the condition is the same as that at the time of storage. Therefore, reusability thereof within a limited range can also be taken into consideration. When the resolution is converted to a low resolution, further improvement of productivity can be expected by using also the sub-scanning scaling due to speed changing mechanism, as explained in the fifth embodiment.

In a sixth embodiment of the embodiments, the service of outputting the image data permanently stored in the HDD 5 is D-BOX output service, however, as explained in the fourth embodiment, an operation of using the "service for delivering permanently stored image data to an external device" is explained below. The reason is that an effect is easily understood because a reuse example is service in which an output destination and an output condition indicated in "permanently stored image data is delivered to an external device while being copied" are entirely different from each other.

When the service for delivering permanently stored image data to an external device is to be used, the user selects image data permanently stored in the HDD 5, sets other desired mode or the like, and enters start of the delivery service to the external device, to the operation display unit 10.

The operation display unit 10 in FIG. 1 converts the information entered by the user to control command data for the inside of the machine and issues the control command data. The issued control command data is notified to the CPU 6 via the PCI-Express bus. The CPU 6 executes the computer program for the service process according to the control command data for starting the delivery service to the external device, and determines a path (channel) through which the image data is passed and a process content of image processes. The delivery service to the external device is determined as the "mode (3) in which the image processes are performed only by the second image data processor 4". An operation process of the mode (3) is explained hereinafter.

In the sixth embodiment, the image data permanently stored in the HDD 5 is transmitted to the memory 7 via the CPU 6 and the bus controller 3. The image data stored in the memory 7 is output to the external I/F unit 12 via the second image data processor 4 and is delivered.

As shown in FIG. 3, the filter processor 50 of the second image data processor 4 corrects the sharpness of the RGB image data so that the reproducibility of the RGB image data is improved upon the scanner delivery. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 51 receives the RGB 8-bit data and converts it to a specified color space. In the sixth embodiment, the RGB data is converted to the sRGB color space with 8 bits for each color.

The scaling processor 52 converts a size (resolution) of the sRGB image data to a size (resolution) for transmission and reception through delivery to a specified external device. In the sixth embodiment, the size is converted to those such as 200 dpi in the main scanning direction multiplied by 200 dpi in the sub-scanning direction.

The gradation processor 53 performs the gradation conversion process on the image data according to gradation processing capability that allows the image data to be transmitted and received through the delivery to the specified external device. In the sixth embodiment, no particular gradation process is performed because 160,000 colors of the 8-bit RGB colors are assumed to be specified.

As explained above, according to the sixth embodiment, it is possible to improve the productivity without losing functionality. According to the sixth embodiment in particular, because the image processes are performed only by the second image data processor 4, it is possible to achieve stable productivity without being affected by any operating condition of the first image data processor 2.

A seventh embodiment of the embodiments includes a case in which the service of delivery of the permanently stored image data to the external device (the image processes are performed only by the second image data processor 4) as explained in the sixth embodiment is used during using the fax direct-transmission service or the remote scan service (the image processes are performed only by the first image data processor 2) as explained in the second embodiment. Alternatively, conversely to the above case, the seventh embodiment includes a case in which the fax direct-transmission service or the remote scan service (the image processes are performed only by the first image data processor 2) is used during using the service of delivery of the permanently stored image data to the external device (the image processes are performed only by the second image data processor 4).

Specifically, in the case of the service as explained in the second embodiment, the image processes are performed only by the first image data processor 2, and in the case of the service as explained in the sixth embodiment, the image processes are performed only by the second image data processor 4. Therefore, even if the both services are concurrently operated, the productivity can be maintained without losing functionality.

The seventh embodiment explains a case of using the service of delivery of the image data permanently stored in the HDD 5 to an external device during using, for example, the fax direct-transmission service.

The MFP 100 according to the seventh embodiment uses the fax direct-transmission service as the service of outputting the image data scanned by the scanner 1. The user sets an original on the scanner 1, and performs setting of a desired mode or the like and enters start of the fax direct-transmission service to the operation display unit 10. The operation display unit 10 converts the information entered by the user to control command data for the inside of the machine and issues the control command data. The issued control command data is notified to the CPU 6 via the PCI-Express bus.

The CPU 6 executes the computer program for the service process according to the control command data for starting the fax direct-transmission service, and determines a path (channel) through which the image data is passed and a process content of image processes. The fax direct-transmission service is determined as the "mode (1) in which the image processes are performed only by the first image data processor 2".

Before the original is scanned by the scanner 1 in FIG. 1, device capability information for the fax 15 as a machine in the other side is acquired through negotiation with the fax 15 via the line I/F unit 11, and then the scanner 1 starts scanning the original.

RGB 8-bit digital image data obtained by causing the image scanner 1 to scan the original is subjected, by the first image data processor 2, to image processes suitable for an output destination and an output condition or the like specified by the user, and the processed image data is sent to the bus controller 3.

As shown in FIG. 2, the $\gamma$ converter 30 of the first image data processor 2 converts the RGB image data received from the scanner 1 so that brightness features of the RGB image data are made appropriate. In the seventh embodiment, the image data is converted so as to have a linear feature in the brightness.

The filter processor 31 corrects the sharpness of the RGB image data so that the reproducibility upon fax transmission is improved. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 32 receives the RGB 8-bit data and converts it to monochrome 8-bit data that is generally used in the fax device.

The scaling processor 33 converts a size (resolution) of the monochrome image data to a size (resolution) for transmission and reception by the fax device. In the seventh embodiment, the size is converted to 200 dpi in the main scanning direction. It is noted that conversion of the size to 100 dpi in the sub-scanning direction is performed by means of the sub-scanning scaling due to speed changing mechanism of the scanner 1.

The gradation processor 34 receives the monochrome 8-bit data and performs the gradation conversion process on the data according to gradation processing capability that allows the image data to be transmitted and received by the fax device. In the seventh embodiment, the gradation is binarized using the simple binarization method.

The bus controller 3 receives the image data from the first image data processor 2 and stores it in the memory 7 via the CPU 6. The image data stored in the memory 7 is transmitted to the outside of the MFP 100 via the CPU 6 and the line I/F unit 11.

In the seventh embodiment, the service of delivery of the image data permanently stored in the HDD 5 to an external device is used during using the fax direct-transmission service. First, the user selects image data permanently stored in the HDD 5, and then sets other desired mode or the like and enters start of the delivery service to the external device, to the operation display unit 10.

The operation display unit 10 in FIG. 1 converts the information entered by the user to control command data for the inside of the machine and issues the control command data. The issued control command data is notified to the CPU 6 via the PCI-Express bus. The CPU 6 executes the computer program for the service process according to the control command data for starting the delivery service to the external device, and determines a path (channel) through which the image data is passed and a process content of image processes. The delivery service to the external device is determined as the "mode (3) in which the image processes are performed only by the second image data processor 4".

The image data permanently stored in the HDD 5 is transmitted to the memory 7 via the CPU 6 and the bus controller 3. The image data stored in the memory 7 is output to the external I/F unit 12 via the second image data processor 4 and is delivered.

As shown in FIG. 3, the filter processor 50 of the second image data processor 4 corrects the sharpness of the RGB image data so that the reproducibility of the RGB image data upon the scanner delivery is improved. Specifically, the RGB image data is subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof.

The color converter 51 receives the RGB 8-bit data and converts it to a specified color space. In the seventh embodiment, the RGB data is converted to the sRGB color space with 8 bits for each color.

The scaling processor 52 converts a size (resolution) of the sRGB image data to a size (resolution) for transmission and reception through delivery to a specified external device. In the seventh embodiment, the size is converted to those such as 200 dpi in the main scanning direction multiplied by 200 dpi in the sub-scanning direction.

The gradation processor 53 performs the gradation conversion process on the image data according to gradation processing capability that allows the image data to be transmitted and received through the delivery to a specified external device. In the seventh embodiment, no particular gradation process is performed because 160,000 colors of the 8-bit RGB colors are assumed to be specified.

As explained above, according to the seventh embodiment, the permanently stored image can be subjected to the image processes using only the second image data processor 4 that is the service according to the sixth embodiment in which the permanently stored image is output in the middle of subjecting the scanned image to the image processes using only the first image data processor 2 that is the service according to the second embodiment in which the scanned image is output. Therefore, concurrent operation can be implemented without being affected by mutual operating conditions. In other words, even if the two different services are concurrently operated, the productivity can be maintained without losing functionality.

In the seventh embodiment, conversely to the above case, it is also possible that the scanned image is subjected to the image processes using only the first image data processor 2 that is the service according to the second embodiment in which the scanned image is output in the middle of subjecting the permanently stored image to the image processes using only the second image data processor 4 that is the service according to the sixth embodiment in which the permanently stored image is output. In this case also, similarly to the above case, the productivity can be maintained without losing functionality.

According to the present invention, it is possible to fully bring out the functions and performances of the provided services.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an image scanner that scans an original to acquire scanned image data;
    a first image processor that performs a first image process on the scanned image data to generate first-processed image data;
    an image storage unit that stores therein the first-processed image data;
    a second image processor that performs a second image process on the first-processed image data stored in the image storage unit to generate second-processed image data;
    an image output unit that outputs image data from one of the first-processed image data generated by the first image processor, the first-processed image data stored in the image storage unit, and the second-processed image data generated by the second image processor;
    a service selector through which output service of the image data that is provided to a user who uses the image processing apparatus is selected by the user; and
    an image processing controller that selects at least one of modes in which the image process is performed only by the first image processor, the image processes are performed by a combination of both the first image processor and the second image processor, and the image process is performed only by the second image processor according to a content of the service selected by the user with the service selector, and controls selected image process, wherein the image processing controller provides process control such that while service of outputting the scanned image data that has been permanently stored in the image storage unit is selected through the service selector and the scanned image data that has been permanently stored in the image storage unit is subjected to the image process only by the second image processor, service of outputting the scanned image data is selected through the service selector and the scanned image data is subjected to the image process only by the first image processor.

2. The image processing apparatus according to claim 1, wherein the image processing controller provides control such that when the service is a service relating to outputting the scanned image data from the image output unit, the scanned image data is subjected to the image process only by the first image processor.

3. An image processing method comprising:
    scanning an original to acquire scanned image data;
    first image processing including performing a first image process on the scanned image data to generate first-processed image data;
    storing the first-processed image data in an image storage unit;
    second image processing including performing a second image process on the first-processed image data stored in the image storage unit to generate second-processed image data;
    outputting image data from one of the first-processed image data generated at the first image processing, the first-processed image data stored in the image storage unit, and the second-processed image data generated by the second image processing; and
    first selecting including selecting at least one of modes in which the image process is performed only at the first image processing, the image processes are performed by a combination of both the first image processing and the second image processing, and the image process is performed only at the second image processing according to a content of a service selected by a user and controlling selected image process, wherein the first selecting includes controlling such that while service of outputting the scanned image data that has been permanently stored in the image storage unit is selected by the user and the scanned image data that has been permanently stored in the image storage unit is subjected to the image process only at the second image processing, service of outputting the scanned image data is selected by the user and the scanned image data is subjected to the image process only at the first image processing.

4. The image processing method according to claim 3, wherein, when the service is a service relating to outputting the scanned image data at the outputting, the first selecting includes selecting a mode in which the scanned image data is subjected to the image process only at the first image processing.

5. A computer program product comprising a non-transitory computer usable medium having computer readable program codes embodied in the medium that, when executed, causes a computer to execute the image processing method according to claim 3.

* * * * *